US009606359B2

(12) United States Patent
Itani

(10) Patent No.: US 9,606,359 B2
(45) Date of Patent: Mar. 28, 2017

(54) METHOD AND APPARATUS FOR CONTROLLING FOCAL VERGENCE OF OPTICAL CONTENT

(71) Applicant: Atheer, Inc., Mountain View, CA (US)

(72) Inventor: Sleiman Itani, East Palo Alto, CA (US)

(73) Assignee: ATHEER, INC., Mountain View, CA (US)

( * ) Notice: Subject to any disclaimer, the term of this patent is extended or adjusted under 35 U.S.C. 154(b) by 0 days.

(21) Appl. No.: 14/278,322

(22) Filed: May 15, 2014

(65) Prior Publication Data

US 2015/0331237 A1    Nov. 19, 2015

(51) Int. Cl.
*G02B 27/22* (2006.01)
*G02B 27/01* (2006.01)

(52) U.S. Cl.
CPC ..... *G02B 27/0172* (2013.01); *G02B 27/0101* (2013.01); *G02B 27/2228* (2013.01); *G02B 2027/014* (2013.01); *G02B 2027/0134* (2013.01); *G02B 2027/0178* (2013.01)

(58) Field of Classification Search
CPC ............. G02B 27/22; G02B 21/22; G02B 2027/0134; G02B 2027/014; G02B 2027/0132; G02B 27/017; G02B 27/2242; G02B 2027/0123; G02B 2027/0178; G02B 7/06; H04N 2213/008
USPC ............ 359/466, 467, 475, 476, 477
See application file for complete search history.

(56) References Cited

U.S. PATENT DOCUMENTS

2002/0190923 A1* 12/2002 Ronzani et al. ............ 345/50
2003/0071765 A1* 4/2003 Suyama et al. ............. 345/6

* cited by examiner

*Primary Examiner* — Jade R Chwasz
(74) *Attorney, Agent, or Firm* — Perkins Coie LLP

(57) ABSTRACT

A first optic receives optical environment content for delivery to the see-through display. The see-through display delivers output optical content to the second optic and delivers the optical environment content to the second optic. The second optic delivers the optical output content and optical environment content to a viewing position. The first optic alters the focal vergence of the optical environment content; the second optic alters the focal vergence of the optical environment content and the focal vergence of the optical output content. The focal vergences of the optical output content and optical environment content thus are independently controllable. The first and second optics may render the focal vergence of the optical environment content after first and second optics substantially equal to optical environment content unmodified by either the first or second optics. The focal vergences of optical environment content and output content may be equal after alteration.

29 Claims, 8 Drawing Sheets

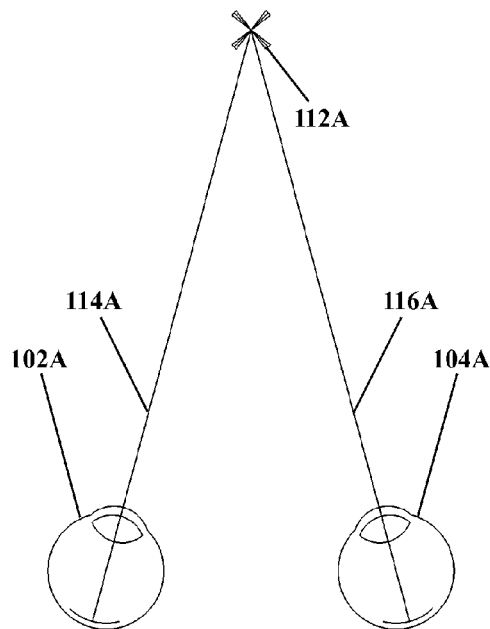
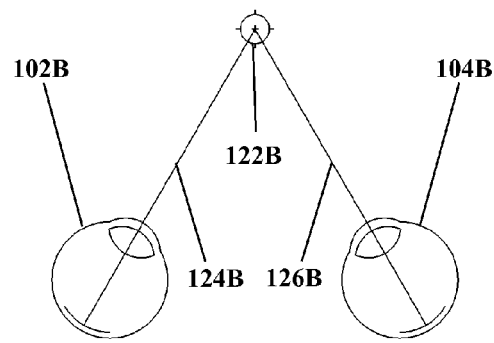
FIG. 1A
FIG. 1B
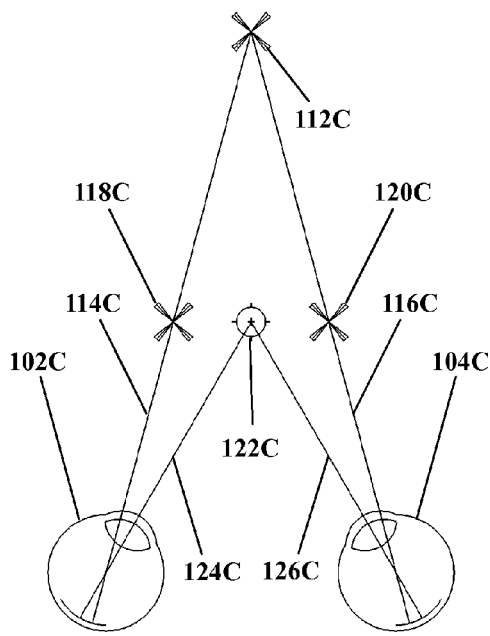
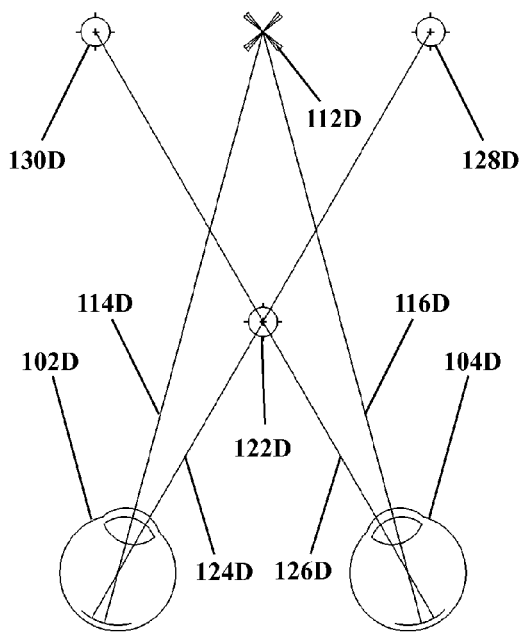
FIG. 1C
FIG. 1D

METHOD AND APPARATUS FOR CONTROLLING FOCAL VERGENCE OF OPTICAL CONTENT

FIELD OF THE INVENTION

The present invention relates to the control of focal vergence of optical content. More particularly, the present invention relates to controlling the focal vergence of content generated by and/or transmitted through a display system, without necessarily applying the same changes in focal vergence to both the generated and transmitted optical content.

DESCRIPTION OF RELATED ART

A variety of devices may deliver some form of generated optical content. For example, a head mounted display system may generate augmented reality content, such as information regarding position, speed, landmarks, etc. and deliver that content to a viewer. Such content typically has some degree focal vergence (whether convergent, divergent, or parallel), that is, the content is generated and/or displayed so as to have a focus that corresponds to some depth or distance from the viewer. For example, augmented reality content in a head mounted display might be delivered with a focal vergence such that the content is in focus at infinity, so that to the viewer the content would appear to be at infinity (even though the display may be only a few millimeters from the viewer's eyes).

Certain optical devices that generate content may also deliver environmental content, for example through the use of a see-through display that allows imagery of an environment surrounding a viewer to be seen as well. Thus, both content outputted from the display and content passed through the display may be visible to a viewer at the same time, may be overlaid, etc. As a more concrete example, augmented reality content generated and delivered by a head mounted display may be overlaid onto the physical world as seen through the display.

In at least some instances it may be desirable to alter the focal vergence of the output content, for example so that output content appears to the viewer to be at the same depth as environment content. It may also be desirable to alter the focal vergence of output content without producing a corresponding change in the vergence of the environment content. Although it may be suitable to control or specify the focal vergence of output content during generation, or between generation and display to a viewer, certain display systems may function properly only with output content of fixed focal vergence, and/or a specific fixed focal vergence (e.g. parallel vergence corresponding to focus at infinity). For at least such systems, controlling focal vergence of output content "upstream" from the display itself may be problematic.

BRIEF SUMMARY OF THE INVENTION

The present invention contemplates a variety of systems, apparatus, methods, and paradigms for controlling the focal vergence of output content and/or environment content as delivered from and/or through a display.

In one embodiment of the present invention, an apparatus is provided that includes a first optic, a see-through display, and a second optic. The first optic is adapted to receive optical environment content and deliver the optical environment content to the see-through display. The see-through display is adapted to deliver optical output content to the second optic, and to receive the optical environment content and deliver the optical environment content to the second optic. The second optic is adapted to receive the optical output content and the optical environment content and deliver the optical output content and the optical environment content to a viewing position. The first optic is also adapted to alter the focal vergence of the optical environment content, and the second optic is adapted to alter the focal vergence of the optical environment content and to alter the focal vergence of the optical output content. These alterations to focal vergences are such that the focal vergence of the optical output content and the focal vergence of the optical environment content are alterable substantially independently.

The first optic and the second optic may be adapted such that the focal vergence of the optical environment content after alteration by both the first and second optics is substantially equal to the focal vergence of the optical environment content before alteration by either the first or second optics.

The focal vergence of the optical environment content after alteration by the first and second optics may be substantially equal to the focal vergence of the optical output content after alteration by the second optics.

The first optic may be adjustable so as to enable changing the alteration of focal vergence of the first optic. The second optic may be adjustable so as to enable changing the alteration of focal vergence of the second optic.

The apparatus may include a first actuator engaged with the first optic so as to change the alteration of focal vergence of the first optic. The apparatus may include a second actuator engaged with the second optic so as to change the alteration of focal vergence of the second optic.

The apparatus may include a processor in communication with the first actuator so as to control the alteration of focal vergence of the first optic. The apparatus may include a processor in communication with the second actuator so as to control the alteration of focal vergence of the second optic.

The apparatus may include a first actuator engaged with the first optic, a second actuator engaged with the second optic, and a processor in communication with the first and second actuators. The first optic may be adjustable so as to enable changing the degree of alteration of focal vergence of the first optic. The second optic may be adjustable so as to enable changing the degree of alteration of focal vergence of the second optic. The first actuator may be adapted to change the degree of alteration of focal vergence of the first optic. The second actuator may be adapted to change the degree of alteration of focal vergence of the second optic. The processor may be adapted to control the degree of alteration of focal vergence of the first optic. The processor may be adapted to control the degree of alteration of focal vergence of the second optic.

The apparatus may include a sensor in communication with the processor, the sensor being adapted to determine the distance to the optical environment content, and adapted to determine the focal vergence of the optical environment content prior to alteration by either of the first and second optics from the distance to the optical environment content.

The display may be adapted to substantially only deliver the optical output content with the focal vergence of the optical output content substantially fixed. The display may be adapted to substantially only deliver the optical output content with the focal vergence of the optical output content substantially parallel.

The first optic may include a liquid optical element, a deformable optical element, an electrodeformable optical element, and/or a mechanically adjustable optical element. The second optic may include a liquid optical element, a deformable optical element, an electrodeformable optical element, and/or a mechanically adjustable optical element.

The first optic, see-through display, and second optic may form an integrated assembly.

In another embodiment of the present invention, an apparatus is provided that includes a left first optic, a left see-through display, a left second optic, a right first optic, a right see-through display, and a right second optic.

The left first optic is adapted to receive left optical environment content and deliver the left optical environment content to the left see-through display. The left see-through display is adapted to deliver left optical output content to the left second optic, and to receive the left optical environment content and deliver the left optical environment content to the left second optic. The left second optic is adapted to receive the left optical output content and the left optical environment content and deliver the left optical output content and the left optical environment content to a left viewing position. The left first optic is adapted to alter the focal vergence of the left optical environment content. The left second optic is adapted to alter the focal vergence of the left optical environment content, and to alter the focal vergence of the left optical output content. The left first optic and left second optic are adapted such that the focal vergence of the left optical environment content after alteration by both the left first and left second optics is substantially equal to the focal vergence of the left optical environment content before alteration by either the left first or left second optics.

The right first optic is adapted to receive right optical environment content and deliver the right optical environment content to the right see-through display. The right see-through display is adapted to deliver right optical output content to the right second optic, and to receive the right optical environment content and deliver the right optical environment content to the right second optic. The right second optic is adapted to receive the right optical output content and the right optical environment content and deliver the right optical output content and the right optical environment content to a right viewing position. The right first optic is adapted to alter the focal vergence of the right optical environment content. The right second optic is adapted to alter the focal vergence of the right optical environment content, and to alter the focal vergence of the right optical output content. The right first optic and right second optic are adapted such that the focal vergence of the right optical environment content after alteration by both the right first and right second optics is substantially equal to the focal vergence of the right optical environment content before alteration by either the right first or right second optics.

The apparatus may include a left first actuator engaged with the left first optic, a left second actuator engaged with the left second optic, a right first actuator engaged with the right first optic, a right second actuator engaged with the right second optic, a processor in communication with the left first actuator, the left second actuator, the right first actuator, and the right second actuator, and a sensor in communication with the processor.

The left first optic may be adjustable so as to enable changing the degree of alteration of focal vergence of the left first optic. The left first actuator may be adapted to change the degree of alteration of focal vergence of the left first optic. The left second optic may be adjustable so as to enable changing the degree of alteration of focal vergence of the left second optic. The left second actuator may be adapted to change the degree of alteration of focal vergence of the left second optic.

The right first optic may be adjustable so as to enable changing the degree of alteration of focal vergence of the right first optic. The right first actuator may be adapted to change the degree of alteration of focal vergence of the right first optic. The right second optic may be adjustable so as to enable changing the degree of alteration of focal vergence of the right second optic. The right second actuator may be adapted to change the degree of alteration of focal vergence of the right second optic.

The processor may be adapted to control the degree of alteration of focal vergence of the left first optic, the degree of focal vergence of the left second optic, the degree of alteration of focal vergence of the right first optic, and the degree of focal vergence of the right second optic. The sensor may be adapted to determine the distance to the optical environment content. The processor may be further adapted to determine the focal vergence of the optical environment content prior to alteration by either of the first and second optics from the distance to the optical environment content.

The focal vergence of the left optical environment content after alteration by the left first and left second optics may be substantially equal to the focal vergence of the left optical output content after alteration by the left second optics. The focal vergence of the right optical environment content after alteration by the right first and right second optics may be substantially equal to the focal vergence of the right optical output content after alteration by the right second optics. The see-through display may be adapted to substantially only deliver the optical output content with the focal vergence of the optical output content substantially fixed and substantially parallel.

In another embodiment of the present invention, a method is provided that includes receiving optical environment content from an environment to a first optic, and altering the focal vergence of the optical environment content in the first optic. The method includes delivering the optical environment content from the first optic to a see-through display, and delivering optical output content and the optical environment content from the see-through display to a second optic. The method further includes altering the focal vergence of the optical output content and the focal vergence of the optical environment content in the second optic, and delivering the optical environment content and the optical output content from the second optic to a viewing position. The focal vergence of the optical output content and the focal vergence of the optical environment content are alterable independently of one another.

The focal vergence of the optical environment content as received in the first optic may be substantially equal to the focal vergence of the optical environment content as delivered from the second optic. The focal vergence of the optical output content as delivered from the second optic may be substantially equal to the focal vergence of the optical environment content as delivered from the second optic.

The focal vergence of the output content as delivered from the see-through display may be substantially fixed. The focal vergence of the output content as delivered from the see-through display may be substantially parallel.

The method may include adjusting at least one of the focal vergence alteration of the first optic and the focal vergence alteration of the second optic, such that the focal vergence of the optical environment content as received in the first optic is substantially equal to the focal vergence of the optical environment content as delivered from the second optic. The method may include adjusting at least one of the focal vergence alteration of the first optic and the focal vergence alteration of the second optic, such that the focal vergence of the optical output content as delivered from the second optic is substantially equal to the focal vergence of the optical environment content as delivered from the second optic.

They method may include determining the focal vergence of the optical environment content prior to receiving the optical environment content from the environment to the first optic.

In another embodiment of the present invention, an apparatus is provided that includes first means for altering a focal vergence of optical content, means for delivering optical output content, and second means for altering said focal vergence of the optical content. The first means for altering the focal vergence are adapted to receive optical environment content, and to transmit the optical content to the means for delivering optical output content. The means for delivering optical output content are adapted to receive the optical environment content from the first means for altering the focal vergence, and to deliver the optical environment content to the second means for altering the focal vergence. The second means for altering the focal vergence are adapted to receive the optical output content and the optical environment content from the means for delivering optical output content, and to transmit the optical output content and the optical environment content to a viewing position. The focal vergence of the optical environment content as received in the first means for altering focal vergence is substantially equal to the focal vergence of the optical environment content as delivered to the viewing point.

The focal vergence of the optical output content as delivered to the viewing point may be substantially equal to the focal vergence of the optical environment content as delivered to the viewing point.

BRIEF DESCRIPTION OF THE SEVERAL VIEWS OF THE DRAWINGS

Like reference numbers generally indicate corresponding elements in the figures.

FIG. 1A through FIG. 1D show example arrangements of sight lines associated with targets at different focal depths, in schematic form.

DETAILED DESCRIPTION OF THE INVENTION

With reference to FIG. 1A, therein is shown an arrangement of sight lines for stereo vision of a target 112A. As may be seen, left and right sight lines 114A and 116A may be traced from the left and right eyes 102A and 104A respectively to the target 112A.

FIG. 1B shows an arrangement of sight lines to a target 122B. The arrangement in FIG. 1B is at least somewhat similar to that in FIG. 1A. However, as may be seen by comparison of FIG. 1A and FIG. 1B, the target 122B in FIG. 1B is at a different depth or distance with respect to the viewer (represented by eyes 102B and 104B) than is the target 112A from the viewer (represented by eyes 102A and 104A) in FIG. 1A. That is, the target 122B in FIG. 2B is closer to the viewer than the target 112A in FIG. 1A.

Even though the distance to the target 122B in FIG. 1B is less, a similar general arrangement may be observed: left and right sight lines 124B and 126B may be traced from the left and right eyes 102B and 104B respectively to the target 122B.

Turning to FIG. 1C, an arrangement is shown therein with two targets, 112C and 122C. Target 112C is at a greater distance from the viewer (as represented by eyes 102C and 104C) than is target 122C.

The arrangement in FIG. 1C illustrates a feature of human vision, referred to as physiological diplopia, that may occur when two targets 112C and 122C are visible to a viewer, but are a different depths. In the example of FIG. 1C, it is considered that the viewer is focusing on the nearer target 122C. As may be seen, sight lines 124C and 126C may be traced from the viewer's eyes 102C and 104C respectively to the near target 122C.

However, with the viewer's eyes 102C and 104C focused on the near target 122C—that is, focused at the distance corresponding to the near target 122C—the viewer's eyes are not and cannot be focused also on the far target 112C. As a result, sight lines 114C and 116C traced from the viewer's eyes 102C and 104C to the far target 112C produce the appearance to the viewer of two separate images 118C and 120C of the far target 112C, rather than a single image of the far target 112C.

This phenomenon is referred to as physiological diplopia, as noted previously. When a viewer focuses on a target at one depth, targets at other depths may appear doubled. This is an inherent feature of normal human vision.

With regard to FIG. 1D, another example of physiological diplopia is shown therein. Near and far targets 122D and 112D respectively are present before the left and right eyes 102D and 104D respectively of a viewer. In the example of FIG. 1D, the viewer is focused on the far target 112D, along sight lines 114D and 116D. However, the near target 122D appears to the viewer as two images 128D and 130D along sight lines 124D and 126D respectively.

Figure 2A:
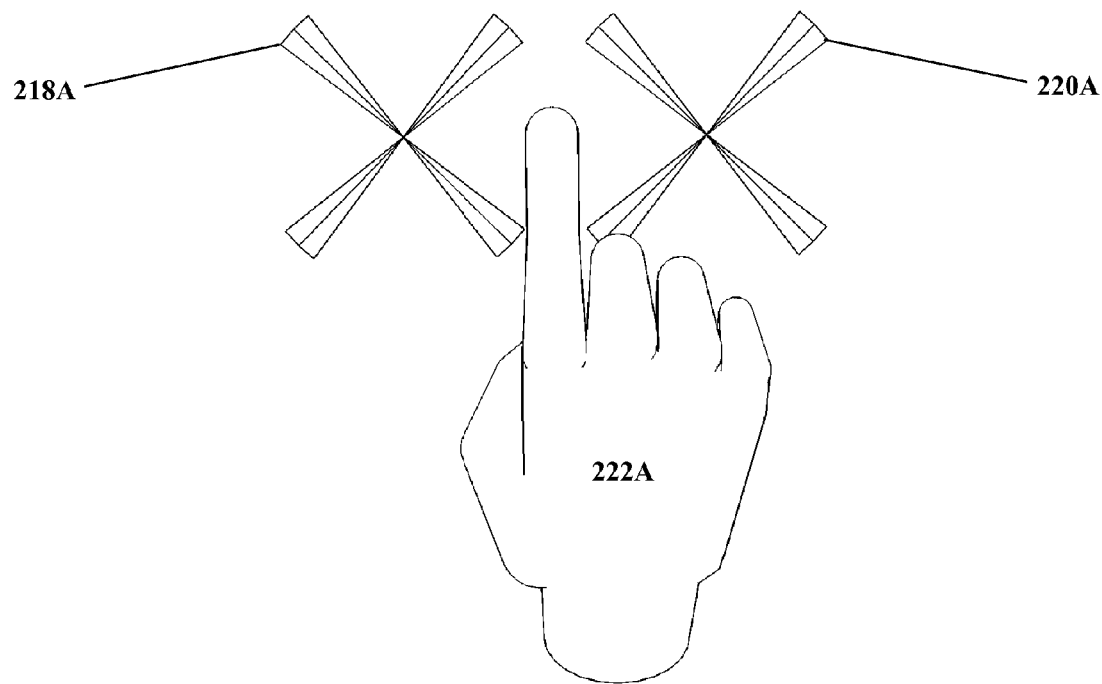
FIG. 2A and FIG. 2B show example arrangements of features associated with targets at different focal depths, as apparent to a viewer thereof.
Figure 2B:
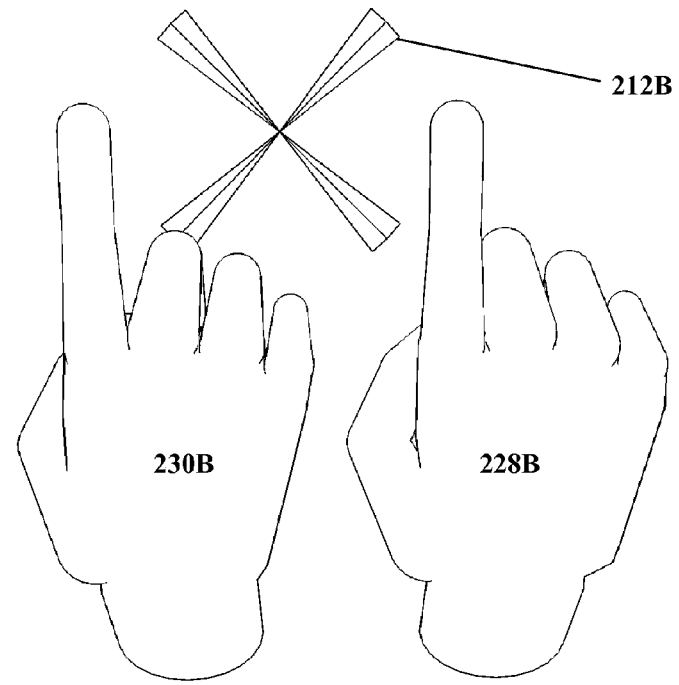

Turning to FIG. 2A, an example arrangement is shown illustrating physiological diplopia from the perspective of a viewer rather than in schematic form. In FIG. 2A a near target 222A is visible in the foreground, the near target 222A in this example taking the form of a hand. It is assumed that a viewer (not shown) is holding up a hand to serve as the near target 222A, and focusing on that hand (near target 222A). Behind the near target 222A, two images 218A and 220A of a far target are visible. The far target is shown as a stylized x-mark, as might represent (for example) an augmented reality marker displayed at infinity by a head mounted display (not shown), though this is an example only. This arrangement in FIG. 2A corresponds at least somewhat to that shown in FIG. 10, wherein two images 118C and 120C of a far target 112C appear on either side of a near target 122C. (In practice, for the arrangement in FIG. 2A the images 218A and 220A typically may appear out-of-focus if the viewer is focused on the near target 222A, however for clarity the images 218A and 220A are shown herein as sharp line art.)

Now with reference to FIG. 2B, another example arrangement is shown illustrating physiological diplopia from the perspective of a viewer. In FIG. 2B a far target 212B is visible in the background; it is assumed that the viewer is focusing on the far target 212B. In front of the far target 212B, two images 228B and 230B of a near target are visible. This arrangement in FIG. 2B corresponds at least somewhat to that shown in FIG. 1D, wherein two images 128D and 130D of a near target 122D appear on either side of a near target 112D.

In addition, it is noted that physiological diplopia can be conveniently demonstrated by an individual so as to be understood thereby. Holding a pen in one hand at arm's length, and extending a finger of the other hand at a closer distance, a viewer may focus on either the pen or the finger. It may be observed that when the viewer focuses on the pen, two images of the finger are visible, typically on either side of the pen (though the exact position is to at least some degree a function of the relative physical positions and the particulars of each viewer's eyes). Likewise, when the viewer focuses on the extended finger two images of the pen are visible, again typically on either side of the finger.

As noted, physiological diplopia is a natural and inherent feature in human vision, one not readily correctable (nor would correction necessarily even be desirable).

Physiological diplopia is described and illustrated herein to provide an example of issues that may arise if content is displayed to a viewer with different depths (or more precisely, two different apparent depths; this distinction is addressed subsequently herein). If, for example, generated visual content is displayed to a viewer overlaid onto real-world imagery (e.g. a control or virtual object disposed in space in front of the viewer), and the generated visual is at a different depth than the real-world imagery, then physiological diplopia may result; the viewer may see either two images of the generated visual content on either side of the real-world imagery, or two images of the real-world imagery on either side of the generated visual content. Furthermore, typically only one of the generated visual content and the real-world imagery could be in-focus to the viewer at any moment.

Such image-doubling and out-of-focus issues may make utilizing augmented reality content problematic. For example, if the viewer is to interact with the generated visual content by (for example) using a hand to manipulate a virtual object, then if the depths of the hand and virtual object are different the viewer will (because of physiological diplopia) perceive either two images of his or her hand or two images of the virtual object. It will be understood that relying upon visual input to manipulate an object may be severely problematic for a user who cannot clearly determine the proper position of either his or her hand or the object in question. As a more concrete example, if a viewer is expected to grip a virtual object with a hand, and either the hand or the object appear to be in two different positions, the viewer may have difficulty even perceiving whether he or she is gripping the object, much less carrying out some specified manipulation.

It is noted that issues of physiological diplopia are presented as examples only, and that they are not intended to represent all issues that may arise from differences in depth (or apparent depth) of content.

Figure 3A:
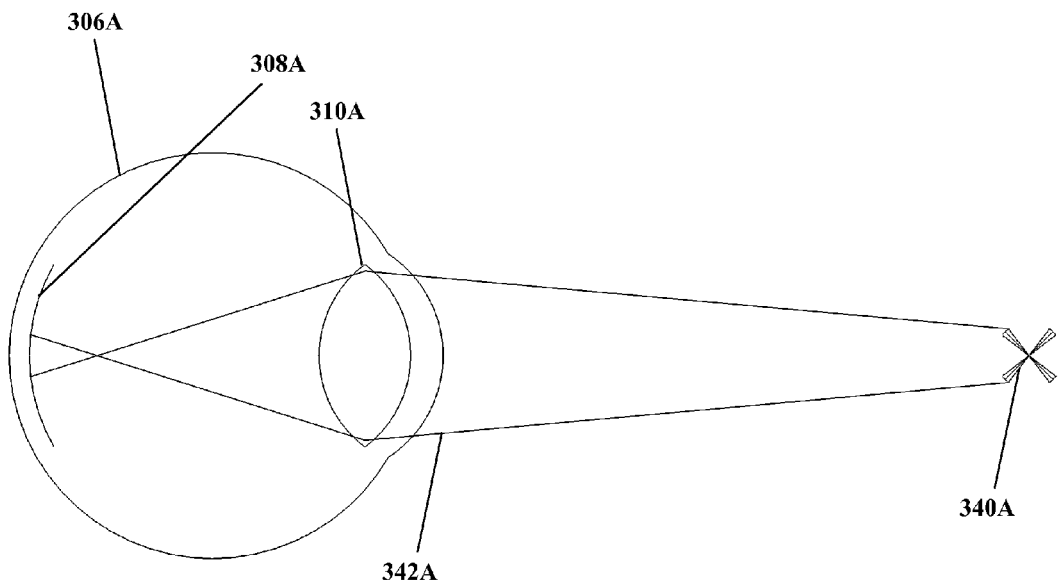
FIG. 3A shows an example of focal vergence for a visual target.

Now with reference to FIG. 3A, therein is shown an example of focal vergence for a visual target. Focal vergence refers to the paths followed by light rays (and/or depicted as sight lines) in moving from one place to another. Focal vergence is a general term encompassing several possible cases; focal convergence refers to light rays/sight lines coming together, focal divergence refers to light rays/sight lines spreading apart, and focal parallel vergence refers to light rays/sight lines remaining parallel without coming together or spreading apart.

It is noted that vergence also may be applied to another feature relating to optics and vision, namely ocular vergence. Ocular vergence should not be confused with focal vergence. Ocular vergence refers to the relative orientation of eyes in binocular vision (or cameras, etc.); typically human eyes for example point at least slightly inward, toward one another, so that sight lines drawn from the center of each retina through the center of each lens and pupil will converge at some distance from the viewer. Ocular vergence is visible (but not numbered or specifically identified) in FIG. 1A through FIG. 1D. However, ocular vergence is distinct from focal vergence; the following discussion refers to focal vergence, and ocular vergence is noted here to avoid potential confusion.

Returning to FIG. 3A, an eye 306A is shown therein. The retina 308A and lens 310A of the eye 306A also are shown therein. In addition, a target 340A is shown in the form of a stylized x-mark. The target 340A may be substantially any visual feature; in certain places subsequently herein the stylized x-mark is used to refer to optical output content, such as virtual reality content, augmented reality content, etc. as might be generated and/or delivered by a display system. However, the arrangement of FIG. 3A is not necessarily specific to only optical output content; the target 340A may represent any optical feature, whether virtual, augmented, physical, etc.

As may be seen, focal vergence lines 342A are shown in FIG. 3A extending from the target 340A to the lens 310A, and then on to the retina 308A. Focal vergence within the eye 306A is determined at least in part by the optical properties of the eye 306A itself, e.g. the curvature of the lens 310A (as controlled by muscles surrounding it). The present invention does not address or directly modify focal vergence within the eye 306A, but focal vergence lines are shown within the eye 306A for purposes of clarity.

With regard to focal vergence lines 342A between the target 340A and the eye 306A, it should be understood that the focal vergence for any particular target 340A is in part a function of the distance between the eye 306A and the target 340A. A target 340A that is close will exhibit greater focal divergence (or less focal convergence) than a target 340A that is far away (other factors being equal). A target 340A that is sufficiently distant may exhibit focal vergence that is substantially parallel, that is, light rays from the target 340A may be approximately parallel. (This may be observed with sunlight, which—coming from a source approximately 93 million miles away—typically exhibits very nearly parallel vergence.)

Focal vergence and depth/distance thus are related. In at least some circumstances depth and/or distance may be determined from focal vergence, and vice versa.

Figure 3B:
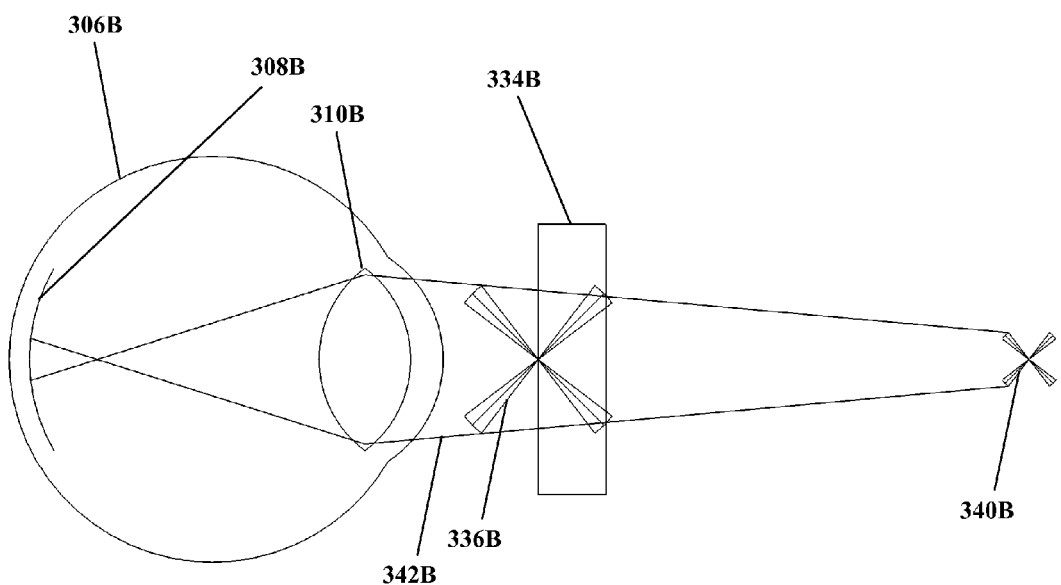
FIG. 3B shows an example of focal vergence for a displayed visual target having an apparent focal depth different from an display depth thereof.

Turning now to FIG. 3B, another example is shown therein of focal vergence for a visual target. In FIG. 3B, an eye 306B is shown with retina 308B and lens 310B thereof. In addition, a display 334B is also shown. As may be seen, a displayed output target 336B is shown being displayed on the display 334B. In practice the displayed output target 336B typically may be flat along the surface of the display 334B, but such would appear (if visible at all) only as an almost-invisibly thin profile; therefor for illustrative purposes the displayed output target 336B is shown as a stylized x-mark centered on the surface of the display 334B closest to the eye 306B.

The displayed output target 336B is displayed with a particular focal vergence, as shown by focal vergence lines 342B. The focal vergence of the displayed output target 336B is such that the displayed output target 336 is in focus, not at the distance corresponding to the surface of the display 334B, but at a greater distance; because of this, to the viewer (whose eye 306B is shown) the content being displayed would appear to be in a position represented by the perceived output target 340B, shown as a smaller stylized x-mark.

More generally, optical content delivered by a display may be delivered with a focal vergence that does not correspond to the actual distance between the viewer and the display. Rather, as shown in FIG. 3B, optical content may be delivered with focal vergence such that the content appears to be at some other distance, up to and including infinity. Put another way, content may be delivered with a degree of focus corresponding to some distance other than the distance at which the screen (or other display system) is physically disposed.

However, although focal vergence may in principle be controlled, not all display systems are necessarily capable of controlling focal vergence in practice. For example, certain display systems require that optical content be delivered with some fixed focal vergence, that is, content is displayed with a fixed focus. Moreover, for certain display systems it may be required not only that optical content have a fixed focal vergence, but that the focal vergence be fixed at a particular value. For example, certain display systems that use optical substrates to deliver image content may function optimally only when that image content has parallel focal vergence; if the focal vergence is not parallel, images may be dispersed, may overlap, or may exhibit other undesired optical effects. For such a system therefor, any image content delivered by the display will have and indeed must have parallel focal convergence; that is, the image content is delivered always and only focused for infinity. In such instance, altering the focal vergence within the display itself may not be a viable option, since doing so may severely degrade the image quality.

However, as previously noted with regard to FIG. 1A through FIG. 1D, delivering optical output content from a display with a focal vergence different from that of optical environment content visible through the display may be severely problematic, resulting in double-images of optical output content and/or optical environment content.

As will be described and shown with regard to examples in FIG. 4A through FIG. 4D the present invention enables control of focal vergence of optical content, even when that content may be delivered with a fixed focal vergence (including but not limited to fixed parallel focal vergence) as noted above. Thus issues such as those illustrated in FIG. 1A through FIG. 1D and described with respect thereto may be alleviated or avoided altogether.

Figure 4A:
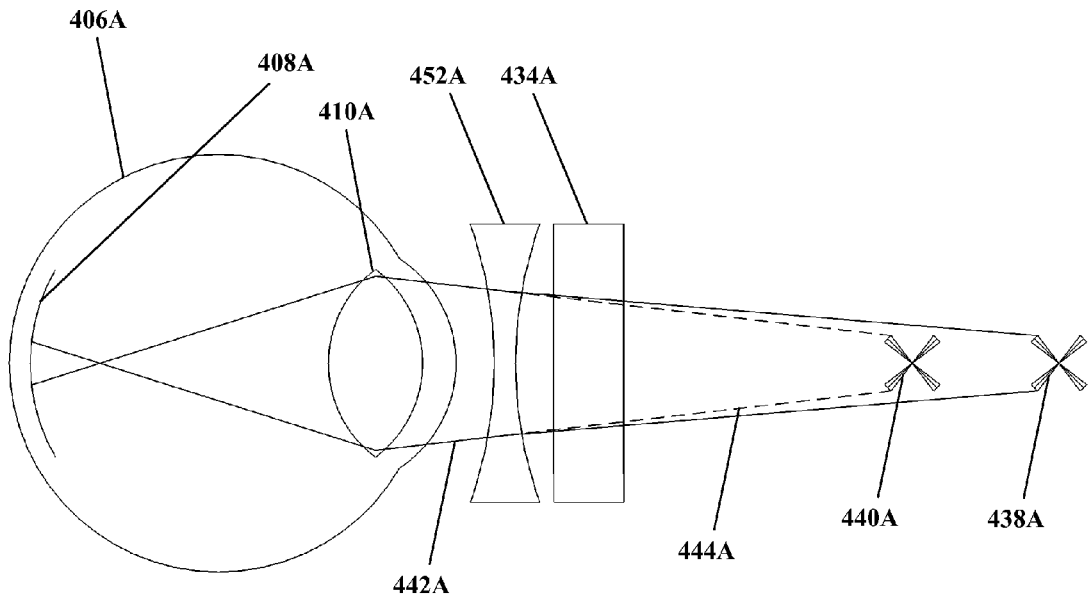
FIG. 4A shows an example of focal vergence for a displayed visual target having an apparent focal depth as modified with a first optic.

With regard to FIG. 4A, a portion of an apparatus according to the present invention is shown therein disposed in relation to a viewer. In FIG. 4A, an eye 406A is shown with a retina 408A and lens 410A thereof. It is emphasized that the eye 406A, retina 408A, and lens 410A are not intended as part of the present invention; rather the present invention may be used with a viewer's eye or eyes, and thus an eye is shown for explanatory purposes.

The arrangement in FIG. 4A also shows a display 434A. The display 434A delivers an output target 438A, illustrated in the form of a stylized x-mark (though this form is an example only). The output target 438A is delivered with a focal vergence indicated by focal vergence lines 432A, the focal vergence corresponding to a point in space at some distance from the display 343A and also from the eye 406A. (As noted earlier, the output target 438A may have, and in the example of FIG. 4A does have, a focal vergence such that the output target 483A would be in focus at a position other that the actual display surface of the display 434A. Although the output target may be displayed at a surface of the display 434A, this is not shown in FIG. 4A, or likewise FIG. 4B through FIG. 4D, for purposes of simplicity.)

However, as described earlier, it may be desirable to change the focal vergence of optical content delivered by the display 434A, such as the output target 483A, thus also changing an apparent focal depth of that content. Such control of focal vergence (and thus focal depth) may be desirable even if the display 434A can deliver only fixed focal vergence.

In the present invention as illustrated in FIG. 4A, a second optic 452A is shown. The second optic 452A alters the focal vergence of the output target 438A, so that—as perceived by the viewer—the output appears in the position shown by the perceived output target 440A, rather than in the position shown by the output target 438A. That is, although the display delivers optical content with a focal depth shown by the output target 438A, the viewer would actually perceive that optical content as being at a reduced focal depth shown by the perceived output target 440A.

This may also be understood in comparing the focal vergence lines 442A for the output target 438A as delivered with the perceived focal vergence lines 444A (shown as dashed lines in FIG. 4A) for the perceived output target 440A. As may be seen, the first optic 452A alters the path of the focal vergence lines 442A to the path of the perceived focal vergence lines 444A. In the example shown, the first optic 452A is a diverging lens: light rays passing through the lens are made to diverge from their original paths. As shown the focal vergence lines 442A, already divergent, are made to be more strongly divergent as the perceived focal vergence lines 444A. As a result, the apparent position of the output is shifted towards the second optic 452A, and likewise toward the display 434A and the eye 406A.

Thus as shown, the application of a lens, lens assembly, or other optic may alter the focal vergence of output delivered by a display 434A. This alteration of focal vergence is external to the display 434A, and thus does not directly affect the inner workings of the display 434A; even if the display is of a sort that is limited to delivering optical content with fixed focal vergence, the focal vergence of the output nevertheless may be altered.

Although a diverging lens is shown as the second optic 452A in FIG. 4A, this is an example only. Other lenses, including but not limited to converging lenses, may be equally suitable. Likewise, groups or assemblies of lenses or other optical elements also may be equally suitable; the present invention is not limited only to single lenses or even necessarily to lenses at all, so long as the second optic is adapted to alter the focal vergence of light and/or imagery passing therethrough. In particular, it is noted that variable optics, for example optical systems adapted to change focal vergence by varying amounts and/or in varying directions (e.g. convergence and divergence), may be suitable for use as the second optic 452A in the present invention.

Through the use of a suitable second optic 452A as shown in FIG. 4A, optical content delivered by the display 434A may be made to exhibit substantially any focal vergence, and thus may be made to appear to be at substantially any focal depth, regardless of the focal vergence/focal depth at which the display 434A itself delivers the optical content.

Figure 4B:
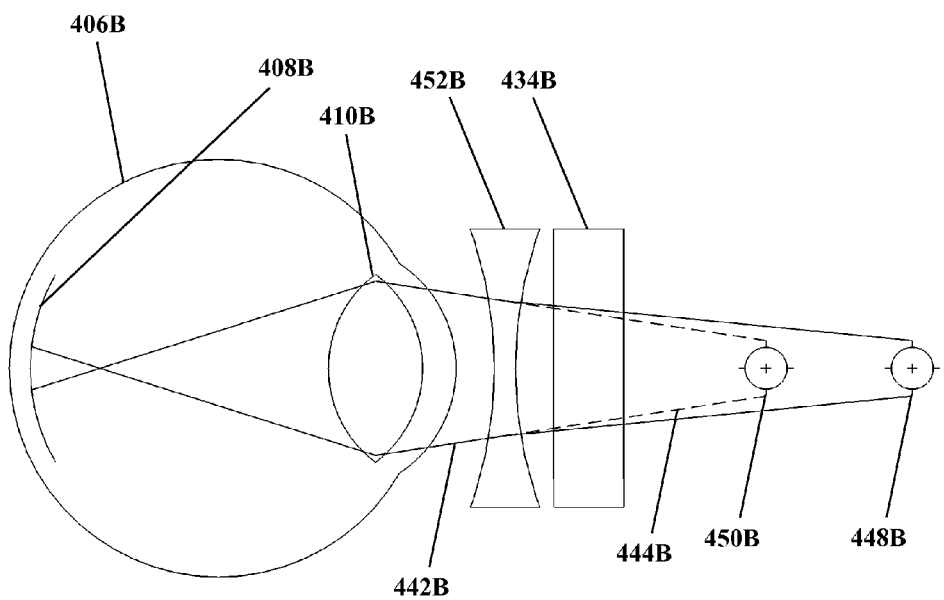
FIG. 4B shows an example of focal vergence for an environmental visual target having an apparent focal depth as modified with a first optic.

However, as may be seen now in FIG. 4B, the effect of a second optic according to the present invention may not apply only to optical content delivered by a display.

In the arrangement shown in FIG. 4B, an eye 406B with retina 408B and lens 410B are again shown. A display 434B is also shown (though no displayed content is illustrated), along with a second optic 452B.

In addition, an environment target 448B is shown, depicted therein as a stylized crosshair. Where an output target from FIG. 4A may be considered to represent displayed content delivered by the display (e.g. augmented reality data such as text, symbols, position marks, icons, etc.), the environment target 448B in FIG. 4B may be considered to represent visual content external to the display 452B. For example, people, animals, physical objects, horizon lines, etc. might be considered to be optical environment targets. Projected or displayed images that are visible without the display 452B also may be considered environment targets, for example an image displayed on a television, monitor, cellular phone, etc. might be considered an environment target even though such an image may be generated by another display.

As may be seen, the second optic 452B affects an environmental target 448B in much the same way as the second optic 452A in FIG. 4A affects an output target 438A: the focal vergence as represented by the focal vergence lines 442B are diverged, so that the perceived focal vergence lines 444B cause the viewer to perceive the environment target 448B to be in the location of the perceived environment target 450B. That is, just as the second optic causes displayed content to appear at a reduced focal depth, so too the second optic causes external content to appear at a reduced focal depth.

Figure 4C:
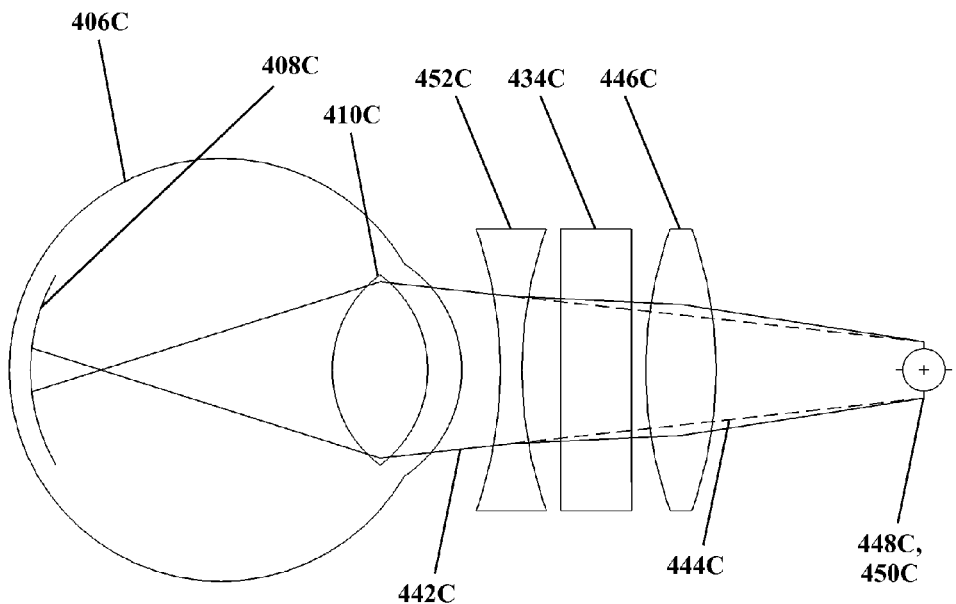
FIG. 4C shows an example of focal vergence for an environmental visual target having an apparent focal depth as modified with a first optic and a second optic.

Now with reference to FIG. 4C, an apparatus according to the present invention is shown therein. FIG. 4C illustrates an eye 406C with retina 408C and lens 410C. A display 434C and second optic 452C of the present invention are shown, along with a first optic 446C also of the present invention.

As may be seen, in the example of FIG. 4C the first optic 446C serves as a "neutralizing lens" (or lens system, etc.) with respect to the second optic 452C: the first optic 446C provides a counter to the effect of the second optic 452C with regard to focal vergence (and thus apparent focal depth), so that with respect to the viewer the focal vergence for an environment target 448C without considering either the first and second optics 446C and 452C is substantially equal to the focal vergence of a perceived environment target 450C. That is, optical environment content appears to be at substantially the same focal distance when having passed through both the first and second optics 446C and 452C as when having passed through neither the first nor the second optics 446C and 452C.

With regard more specifically to focal vergence, as may be seen the focal vergence lines 442C are first altered by the first optic 446C so as to be more convergent (or less divergent, in the particular example shown), pass through the see-through display 434C, and then are made to be more divergent by the second optic 452C. Consequently, the perceived focal vergence lines 444C trace back to substantially the same position as the focal vergence lines 442C. In other words, the locations of the environment target 448C and the perceived environment target 450C are substantially the same. Put colloquially, environmental features may be made appear "where they're supposed to", with the changes applied thereto by the second optic 452C being counteracted or neutralized by the first optic 446C.

However, it will be understood that output content delivered by the display 434C, the display 434C being inward from the first optic 446C (closer to the viewer's eye 406C), would be unaffected by the first optic 446C. Thus the changes in focal vergence to output content produced by the second optic 452C would not be neutralized by the first optic 446C.

Figure 4D:
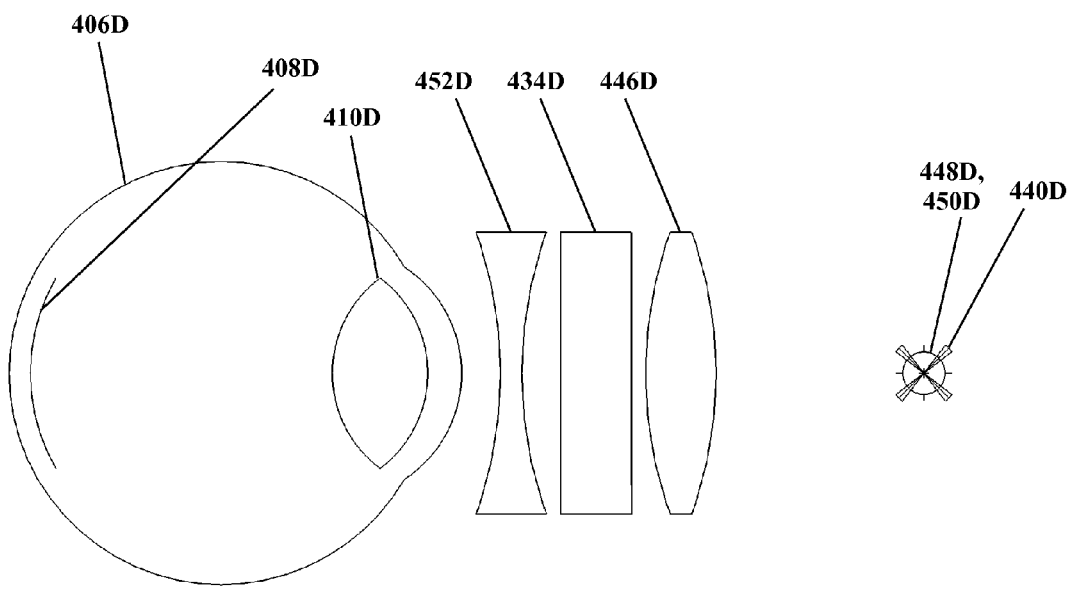
FIG. 4D shows an example arrangement of a displayed visual target and an environmental visual target having substantially equal apparent focal depths.

Turning to FIG. 4D, a result of an example apparatus according to the present invention is shown. Therein is shown an eye 406D with retina 408D and lens 410D. A display 434D, first optic 446D, and second optic 452D of the present invention are also shown.

In addition, a perceived output target 440D is shown, at a focal depth as would be perceived by the viewer. The output target itself is not shown; as shown and described with regard to FIG. 4A the perceived output target 440D may be disposed at substantially any apparent focal depth, regardless of the focal depth for which the output target is delivered by the display 434D. The output target as delivered by the display 434D might have a focal depth of infinity, which would not be visible in FIG. 4D the output target thus being, apparently at least, an infinite distance to the right from the illustration). Because the focal vergence and thus focal depth of the perceived output target 440D may be controlled substantially at will through selection of a suitable second optic 452D according to the present invention, the original focal depth of the output target as delivered by the display 434D is not particularly limited and thus is not shown in FIG. 4D.

Furthermore, an environment target 448D is shown in FIG. 4D. The stylized crosshair shown therein is identified as both the environment target 448D and as the perceived environment target 450D. As previously described with regard to FIG. 4C, through suitable selection of a first optic 446D (relative to the second optic 452D) according to the present invention the perceived focal vergence to (and thus perceived focal depth of) the perceived environment target 450D may be controlled such that the perceived environment target 450D may appear in substantially the same place as the (unmodified) environment target 448D.

Thus, as shown in FIG. 4D an apparatus according to the present invention may control the apparent focal vergence (and thus focal depth) of content delivered to a display, without affecting the apparent focal vergence of content passing through that display. Consequently, as illustrated in the example of FIG. 4D, displayed content and environmental content may be made to be in-focus at the same depth, in particular the original depth of the environmental content. This may be accomplished by the present invention regardless of the initial focal vergence of the displayed content, or the limitations of the display with regard to delivering such content.

However, although FIG. 4C and FIG. 4D show an arrangement for fully neutralizing the effects of the second optic on environment content through the use of the first optic, this is an example only, and the present invention is not limited only to such neutralization. Rather, the present invention more generally enables control of the focal vergence of displayed content and the focal vergence of environment content, independently of one another. While the arrangements in FIG. 4C and FIG. 4D show a particular example of such independent control, namely to change the focal vergence of the displayed content to substantially equal the focal vergence of the environment content without also changing the focal vergence of the environment content, other arrangements may be equally suitable.

For example, an apparatus according to the present invention may—through selection of the first and second optics—apply a net change in focus/focal vergence to both displayed and environmental content. As a more concrete example, the apparatus might serve not only to align the focus of displayed content with the focus of environmental content but also to apply an overall focus correction, e.g. to compensate for nearsightedness, farsightedness, etc.

In summary, an apparatus according to the present invention may independently control focal vergence (and focal depth) for both displayed and environmental content. One example application is to substantially align the focal vergence of displayed content with the focal vergence of environmental content, thus reducing or eliminating issues such as those relating to physiological diplopia. However, the present invention is not limited only to such an application.

Figure 5:
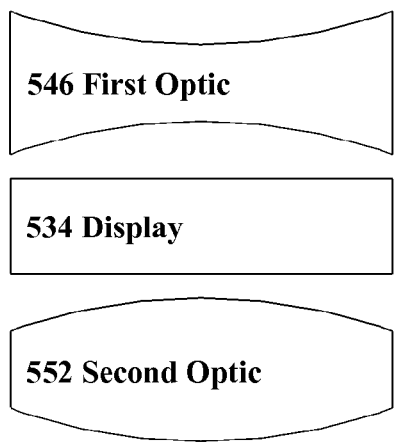
FIG. 5 shows an example arrangement of an apparatus according to the present invention in schematic form.

Turning to FIG. 5, therein an apparatus according to the present invention is shown in schematic form. The apparatus includes a first optic 546, a second optic 552, and a see-through display 534. The see-through display 534 is engaged with the first and second optics 546 and 552 such that light and/or image content from the environment may be received by the first optic 546 and delivered to the display 534, passed through the display, and delivered to the second optic 552. In addition, light and/or image content delivered by the display 534 may be delivered to the second optic 552.

The present invention is not particularly limited with regard to the specifics of the see-through display 534, a first optic 546, and a second optic 552.

The see-through display 534 is adapted to deliver visual content for receipt by a viewer. The see-through display 534 may be fully transparent, or may filter light in some fashion, block some light, modify some or all light passing therethrough, etc.

As illustrated in FIG. 5, the entire display 534 is disposed geometrically between the first and second optics 546 and 552. However, this is an example only, and other arrangements may be equally suitable. For example, it is noted that certain displays include multiple elements, such as an image generator, a transmission unit for moving the light from the image generator to a position for output, a decoupler to deliver the output in a viewable form, etc. It is not required that the display 534 or any particular physical components thereof be disposed in any particular geometric relationship with regard to the first and second optics 546 and 552. An image generator might be some considerable distance from either the first or the second optics 546 and 552, even if (for example) a decoupler were physically disposed between the first and second optics 546 and 552. Nor is it required that environment imagery physically pass through a display 534 (though this also is not prohibited); an open space carrying (for example) scanning lasers that "draw" images on a retina also may be considered a transparent display for purposes of the present invention.

So long as output light and/or imagery is delivered by the display 534 and passes through the second optic 552 into a viewable position, and environment light and/or imagery passes through the first and second optics 546 and 552 into that viewable position, so as to function as shown and described herein, the physical arrangement of the elements of the present is not particularly limited.

A wide range of devices and systems may be suitable for use as a display 534 according to the present invention. For example, optical output content may be generated by systems including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. Similarly, optical output content may be delivered to a viewer/viewable position by systems including but not limited to light pipes, optical substrates, direct display (e.g. disposing an active LED screen in the line of sight), scanning lasers, etc.

A wide range of devices also may be suitable for the first and second optics 546 and 552. For example, individual lenses or other optical elements of various forms, materials, etc. may be suitable. Although FIG. 5 shows a first optic 546 as a convex (converging) lens and a second optic 552 as a concave (diverging) lens this is an example only, and other arrangements may be equally suitable.

Assemblies of lenses or other optical elements also may be suitable for use as first and second optics 546 and 552. Although for simplicity the singular term "optic" is used to refer to elements 546 and 552, the present invention is not particularly limited to the number of optical components in either the first or the second optic 546 and 552.

Variable optical elements and/or assemblies may be suitable for use as first and second optics 546 and 552. For example, first and/or second optics 546 and 552 that may vary in their optical properties, such as degree and direction of vergence (e.g. convergence or divergence), may be suitable. In particular, arrangements wherein the first and/or second optics 546 and 552 are adjustable so as to change the alteration of focal vergence thereof may be useful for at least some embodiments. Such adjustability may enable tailoring changes in focal vergence based on local conditions (e.g. distance to environment content), individual viewer characteristics (e.g. nearsightedness), etc.

Suitable optical elements for use as and/or in the first and/or second optics 546 and 552 may include but are not limited to liquid optical elements, deformable optical elements, electrodeformable or otherwise electroresponsive optical elements, and mechanically variable optical assemblies. Also, the first and second optics 546 and 552 are not required to be identical or even similar in form or composition; an apparatus according to the present invention might use a single liquid lens for the first optic 546 but an assembly of multiple rigid lenses for the second optic 552.

It is noted that the present invention may be assembled piecemeal, and/or as an add-on to an existing system. For example, an existing display 534 might be retrofitted with suitable first and second optics 546 and 552 according to the present invention.

Figure 6:
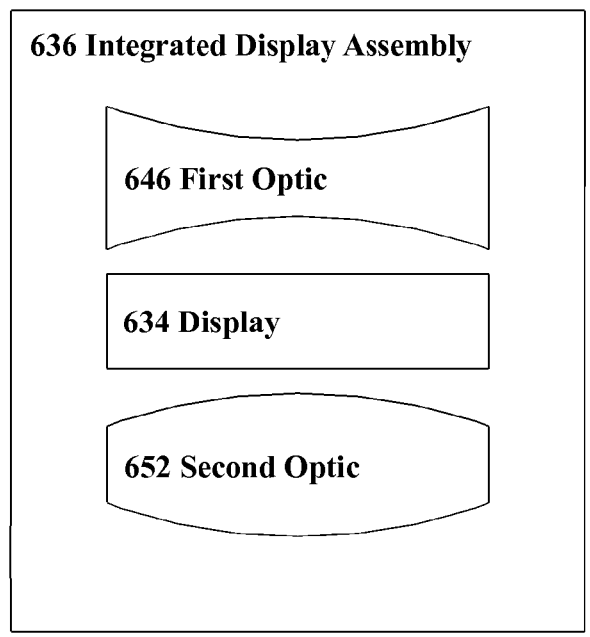
FIG. 6 shows another example arrangement of an apparatus according to the present invention in schematic form, with optical elements thereof integrated into an assembly.

Turning to FIG. 6, although the present invention may be configured using individual elements, and/or as retrofitted elements, the present invention also may be configured as an integrated assembly 636 as shown therein. For example, the first optic 646 and second optic 652 may be physically and/or optically integrated with the display 634 so as to form a single module, optical unit, etc. Such arrangements may for at least certain embodiments enable the present invention to be made particularly compact, reliable, etc. However, this is an example only, and other arrangements may be equally suitable.

Figure 7:
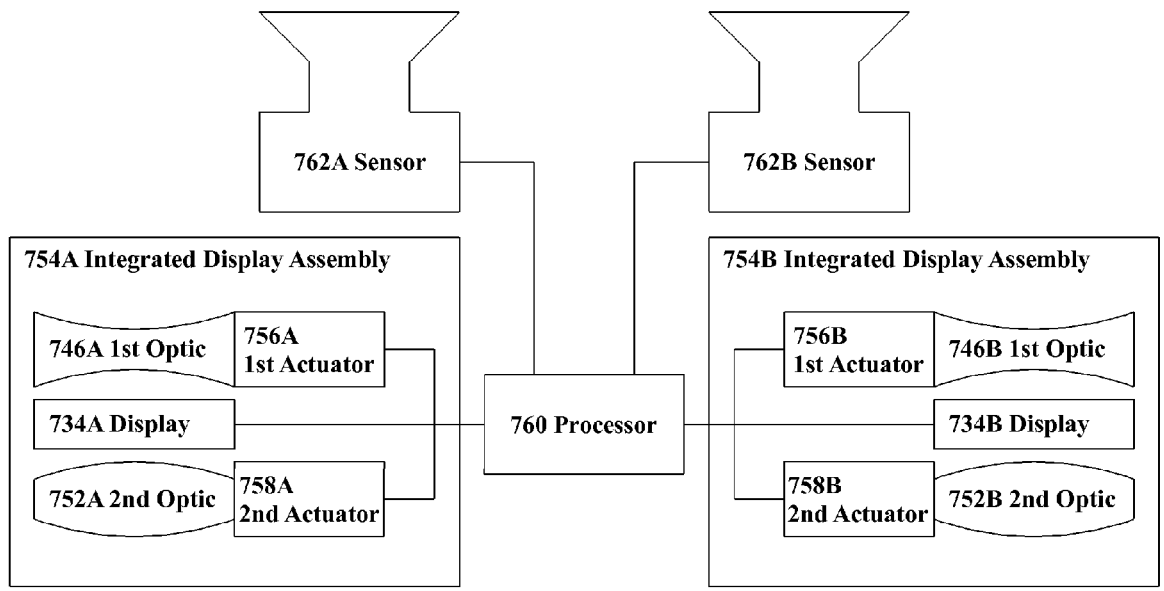
FIG. 7 shows another example arrangement of an apparatus according to the present invention in schematic form, with left and right integrated optical assemblies.

Now with reference to FIG. 7, an apparatus according to the present invention may include numerous elements other than the display, first optic, and second optic as thus far described herein. For example, as shown in FIG. 7 the example apparatus therein includes an integrated display assembly 754A with a first optic 746A, a display 734A, and a second optic 752A, at least somewhat similar to the arrangement shown in FIG. 6. However, the integrated display assembly 754A in FIG. 7 also includes a first actuator 756A adapted to adjust the optical properties of the first optic 746A, e.g. changing the focal length thereof (thus changing the degree and/or direction by which the first optic 746A alters focal vergence); this presumes the first optic 746A is adjustable, as noted previously. The integrated display assembly 754A further includes a second actuator 758A adapted to adjust the optical properties of the second optic 752A.

In addition, the apparatus in FIG. 7 includes a second integrated display assembly 754B. The integrated display assembly 754B includes a first optic 746B, display 734B, second optic 752B, first actuator 756B, and second actuator 758B similar to the integrated display assembly 754A already described. Such a configuration might be suited for example for an arrangement wherein each of a viewer's eyes is provided with an integrated display assembly 754A and 754B, such as might be the case for a stereo display system.

The arrangement of FIG. 7 also includes a processor 760 in communication with the integrated display assemblies 754A and 754B, and with the first actuators 756A and 756B and second actuators 758A and 758B therein. Such an arrangement may for example facilitate control of the first actuators 756A and 756B and second actuators 758A and 758B, and control of the first optics 746A and 746B and second optics 752A and 752B thereby. The processor 760 may also be in communication with and/or in control of the displays 734A and 734B, depending on the particulars of an embodiment.

Further, the arrangement of FIG. 7 includes sensors 762A and 762B in communication with the processor 760. Sensors may be useful in providing a variety of data for facilitating operation of the apparatus. For example, sensors 762A and 762B may be adapted to determine the distance between the viewer or display 734A and 734B and optical environment content; for embodiments wherein the focal vergence of displayed content is to be matched to the focal vergence of environment content, data on what the focal vergence of the environment might usefully be obtained by such sensors 762A and 762B. In addition or instead, sensors 762A and 762B might be adapted to determine where the viewer is looking within the field of view, or to perform other functions that may be useful in displaying and/or manipulating optical content.

Figure 8:
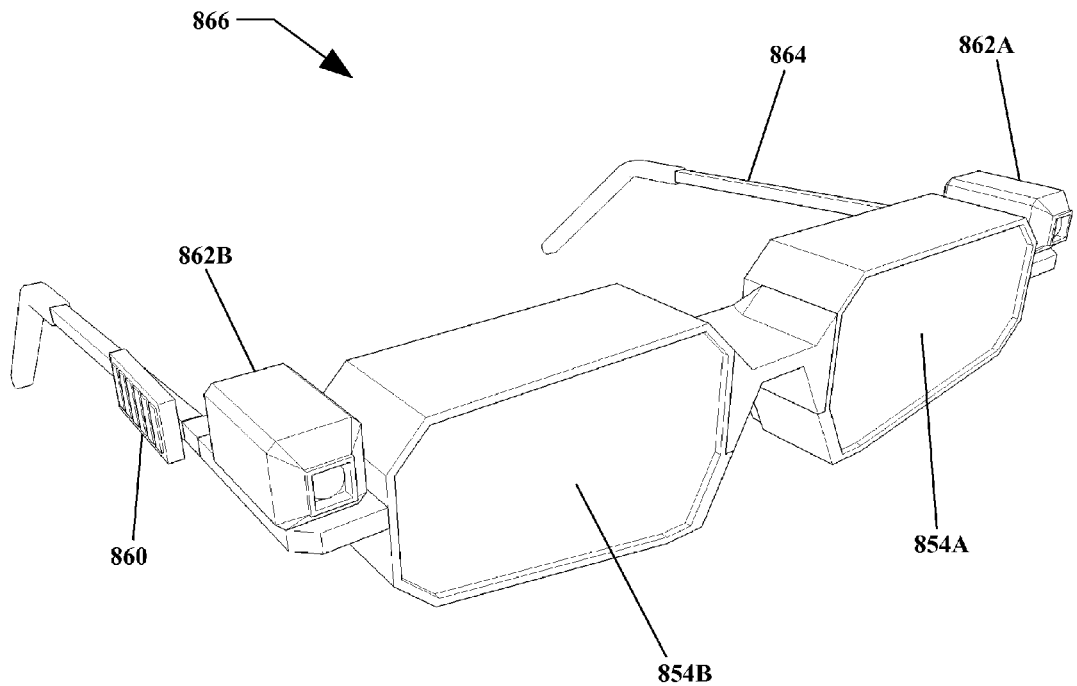
FIG. 8 shows an arrangement of an apparatus according to the present invention in perspective view.

Now with regard to FIG. 8, an apparatus according to the present invention may be implemented in many embodiments taking many forms. One such form is illustrated as an example in FIG. 8, in perspective view. Therein, the apparatus 866 is configured in the form of a head mounted display resembling a pair of glasses. The apparatus shown therein includes integrated display assemblies 854A and 854B, arranged such that when the apparatus 866 is worn the integrated display assemblies 854A and 854B would be disposed near to and in front of a viewer's eyes. Though not visible in FIG. 8, the integrated display assemblies 854A and 854B may include therein first optics, displays, second optics, first and second actuators, etc.

The apparatus 866 also includes a processor 860, and sensors 862A and 862B. A body 864 supports the integrated display assemblies 854A and 854B, processor 860, and sensors 862A and 862B so as to make the apparatus readily wearable in a useful fashion. It is emphasized that the arrangement shown in FIG. 8 is an example only, and that other configurations may be equally suitable.

Figure 9:
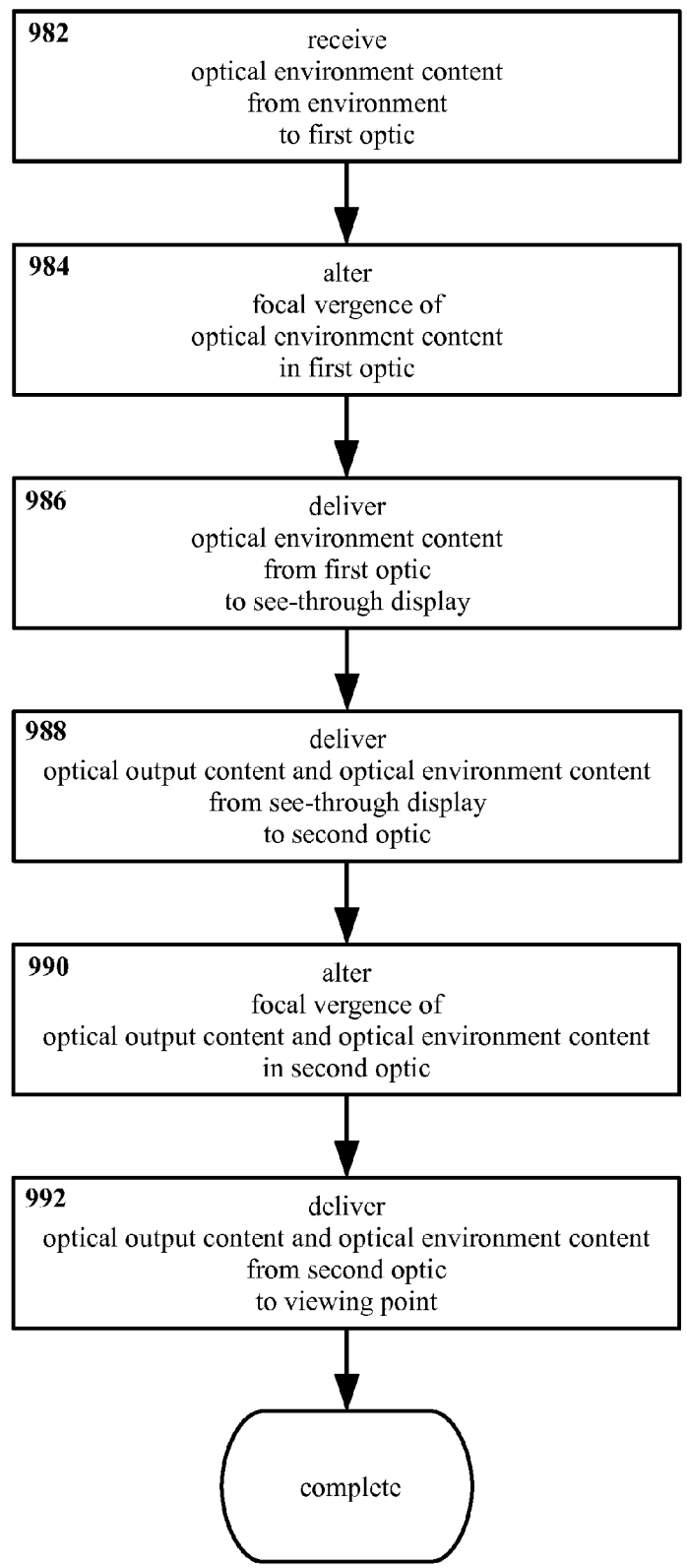
FIG. 9 shows an example method for controlling focal vergence according to the present invention.

Turning to FIG. 9, therein an example embodiment of a method according to the present invention is shown, in flow chart form.

In the method according to FIG. 9, optical environment content is received 982 from the environment to a first optic. As has been previously described herein with regard to apparatus embodiments, optical environment content may represent content not generated within the display system. For example, for a head mounted display optical environment content might include a view of the physical world surrounding the wearer of the head mounted display.

Continuing in FIG. 9, the focal vergence of the optical environment content is altered 984 in the first optic. Depending on the embodiment and other particulars, the focal vergence may be made more convergent or more divergent, and in varying amounts.

The optical environment content is delivered 986 from the first optic to a see-through display.

The optical environment content is then delivered 988 from the see-through display (e.g. passing therethrough) to a second optic. In addition, optical output content is also delivered 988 from the see-through display (e.g. generated and/or outputted by the display) to the second optic.

The focal vergence of both the optical output content and the optical environment content is altered 990 in the second optic.

The optical output content and optical environment content is then delivered 992 from the second optic to a viewing point. For example, the viewing point might be a location for a viewer to place his or her eyes so as to view the optical output content and optical environment content.

The method as shown in FIG. 9 is then complete. However, additional steps and/or repetition of steps already shown may be equally suitable for at least certain embodiments.

Likewise, as previously noted the present invention may include actuation of variable first and second optics, processor control of such actuation (e.g. wherein steps of altering focal vergence may be actively controlled within the processor), sensing of various parameters, etc.

In particular, different embodiments may vary in the particulars of the alteration of focal vergences by the first and second optics in steps 984 and 990 (though other variations are not excluded).

For example, the focal vergence of the optical environment content as received in said first optic may be substantially equal to the focal vergence of said optical environment content as delivered from the second optic. That is, the focal vergence of the optical environment content may be substantially the same both before the first and second optics and after the first and second optics.

In addition or instead, the focal vergence of the optical output content as delivered from the second optic may be substantially equal to the focal vergence of the optical environment content as delivered from the second optic. That is, the focal vergences of the optical output content and optical environment content as delivered to the viewing point may be substantially the same.

The focal vergence of the output content as delivered from the see-through display may be substantially fixed. The focal vergence of the output content as delivered from the see-through display also or alternately may be substantially parallel.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. An apparatus, comprising:
a first optic comprising a first lens;
a see-through display; and
a second optic comprising a second lens;
wherein:
said first optic is adapted to receive optical environment content from an environment external to said apparatus and deliver said optical environment content to said see-through display;
said see-through display is adapted to deliver optical output content to said second optic, and to receive said optical environment content and deliver said optical environment content to said second optic;
said second optic is adapted to receive said optical output content and said optical environment content and deliver said optical output content and said optical environment content to a viewing position;
said first optic is adapted to alter a focal vergence of said optical environment content; and
said second optic is adapted to alter said focal vergence of said optical environment content, and to alter a focal vergence of said optical output content;
such that said focal vergence of said optical output content and said focal vergence of said optical environment content are alterable substantially independently.

2. The apparatus of claim 1, wherein:
said first optic and said second optic are adapted such that said focal vergence of said optical environment content after alteration by both said first and second optics is substantially equal to said focal vergence of said optical environment content before alteration by either said first or second optics.

3. The apparatus of claim 1, wherein:
said focal vergence of said optical environment content after alteration by said first and second optics is substantially equal to said focal vergence of said optical output content after alteration by said second optic.

4. The apparatus of claim 1, wherein:
said first optic is adjustable so as to enable changing an alteration of focal vergence of said first optic.

5. The apparatus of claim 4, comprising:
a first actuator engaged with said first optic so as to change said alteration of focal vergence of said first optic.

6. The apparatus of claim 5, comprising:
a processor in communication with said first actuator so as to control said alteration of focal vergence of said first optic.

7. The apparatus of claim 1, wherein:
said second optic is adjustable so as to enable changing an alteration of focal vergence of said second optic.

8. The apparatus of claim 7, comprising:
a second actuator engaged with said second optic so as to change said alteration of focal vergence of said second optic.

9. The apparatus of claim 8, comprising:
a processor in communication with said second actuator so as to control said alteration of focal vergence of said second optic.

10. The apparatus of claim 1, comprising:
a first actuator engaged with said first optic;
a second actuator engaged with said second optic;
a processor in communication with said first and second actuators;
wherein:
said first optic is adjustable so as to enable changing a degree of alteration of focal vergence of said first optic;
said second optic is adjustable so as to enable changing a degree of alteration of focal vergence of said second optic;
said first actuator is adapted to change said degree of alteration of focal vergence of said first optic;
said second actuator is adapted to change said degree of alteration of focal vergence of said second optic;
said processor is adapted to control said degree of alteration of focal vergence of said first optic; and
said processor is adapted to control said degree of alteration of focal vergence of said second optic.

11. The apparatus of claim 10, comprising:
a sensor in communication with said processor, said sensor being adapted to determine a distance to said optical environment content; and
said processor is adapted to determine said focal vergence of said optical environment content prior to alteration by either of said first and second optics from said distance to said optical environment content.

12. The apparatus of claim 1, wherein:
said display is adapted to substantially only deliver said optical output content with said focal vergence of said optical output content substantially fixed.

13. The apparatus of claim 1, wherein:
said display is adapted to substantially only deliver said optical output content with said focal vergence of said optical output content substantially parallel.

14. The apparatus of claim 1, wherein:
said first optic comprises at least one of a group consisting of a liquid optical element, a deformable optical element, an electrodeformable optical element, and a mechanically adjustable optical element.

15. The apparatus of claim 1, wherein:
said second optic comprises at least one of a group consisting of a liquid optical element, a deformable optical element, an electrodeformable optical element, and a mechanically adjustable optical element.

16. The apparatus of claim 1, wherein:
said first optic, said see-through display, and said second optic comprise an integrated assembly.

17. The apparatus according to claim 1, wherein:
said first optic is adapted to alter said focal vergence of said optical environment content as said optical environment content passes through said first optic; and
said second optic is adapted to alter said focal vergence of said optical environment content as said optical environment content passes through said second optic, and to alter said focal vergence of said optical output content as said optical output content passes through said second optic.

18. A method, comprising:
receiving optical environment content from an external environment to a first optic, said first optic comprising a first lens;
altering a focal vergence of said optical environment content in said first optic;
delivering said optical environment content from said first optic to a see-through display;
delivering optical output content and said optical environment content from said see-through display to a second optic, said second optic comprising a second lens;
altering a focal vergence of said optical output content and said focal vergence of said optical environment content in said second optic; and
delivering said optical environment content and said optical output content from said second optic to a viewing position;
wherein:
said focal vergence of said optical output content and said focal vergence of said optical environment content are alterable independently of one another.

19. The method of claim 18, wherein:
said focal vergence of said optical environment content as received in said first optic is substantially equal to said focal vergence of said optical environment content as delivered from said second optic.

20. The method of claim 18, wherein:
said focal vergence of said optical output content as delivered from said second optic is substantially equal to said focal vergence of said optical environment content as delivered from said second optic.

21. The method of claim 18, wherein:
said focal vergence of said output content as delivered from said see-through display is substantially fixed.

22. The method of claim 18, wherein:
said focal vergence of said output content as delivered from said see-through display is substantially parallel.

23. The method of claim 18, comprising:
adjusting at least one of a focal vergence alteration of said first optic and a focal vergence alteration of said second optic, such that said focal vergence of said optical environment content as received in said first optic is substantially equal to said focal vergence of said optical environment content as delivered from said second optic.

24. The method of claim 18, comprising:
adjusting at least one of a focal vergence alteration of said first optic and a focal vergence alteration of said second optic, such that said focal vergence of said optical output content as delivered from said second optic is substantially equal to said focal vergence of said optical environment content as delivered from said second optic.

25. The method of claim 18, comprising:
determining said focal vergence of said optical environment content prior to receiving said optical environment content from said environment to said first optic.

26. The method according to claim 18, comprising:
altering said focal vergence of said optical environment content by passage through said first optic; and
altering said focal vergence of said optical output content and said focal vergence of said optical environment content by passage through said second optic.

27. An apparatus, comprising:
first means for altering a focal vergence of optical content comprising a first lens;
means for delivering optical output content;
second means for altering said focal vergence of said optical content comprising a second lens;
wherein:
said first means for altering said focal vergence are adapted to receive optical environment content from an environment external to said apparatus, and to transmit said optical content to said means for delivering optical output content;
said means for delivering optical output content are adapted to receive said optical environment content from said first means for altering said focal vergence, and to deliver said optical environment content to said second means for altering said focal vergence;
said second means for altering said focal vergence are adapted to receive said optical output content and said optical environment content from said means for delivering optical output content, and to transmit said optical output content and said optical environment content to a viewing position; and
said focal vergence of said optical environment content as received in said first means for altering focal vergence is substantially equal to said focal vergence of said optical environment content as delivered to said viewing point.

28. The apparatus of claim 27, wherein:
said focal vergence of said optical output content as delivered to said viewing point is substantially equal to said focal vergence of said optical environment content as delivered to said viewing point.

29. An apparatus according to claim 27, wherein:
said first means for altering a focal vergence of optical content is adapted to alter said focal vergence of said optical content in passing through said first means;
said second means for altering said focal vergence of said optical content is adapted to alter said focal vergence of said optical content in passing through said second means.

* * * * *